Inventor:
Max L. Rysdon
By: Bair & Freeman
Attorneys.

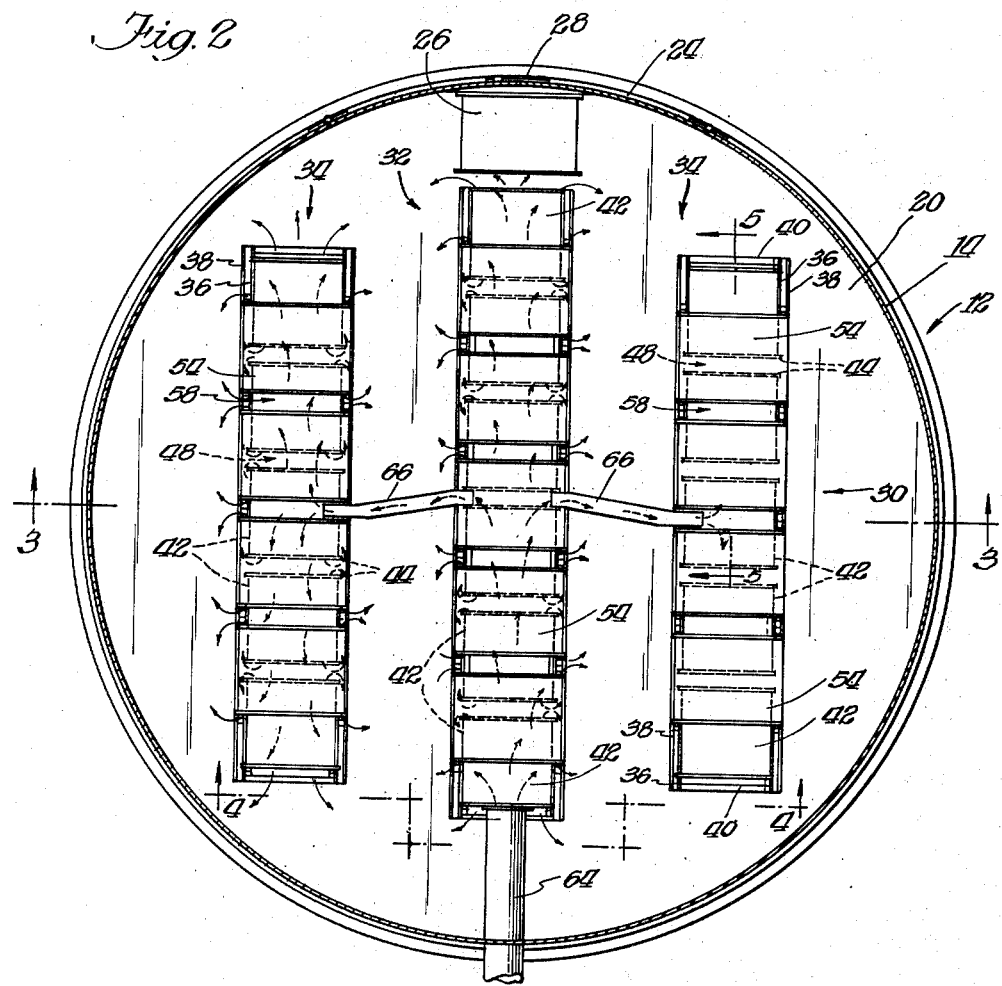

Oct. 3, 1950
M. L. RYSDON
2,524,331
AIR DISTRIBUTING SYSTEM FOR DRYING VARIOUS FARM BULK PRODUCE
Filed Oct. 14, 1947
3 Sheets-Sheet 3
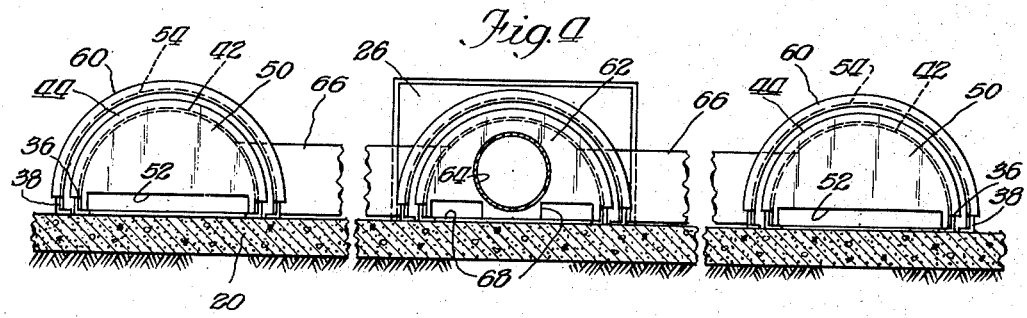
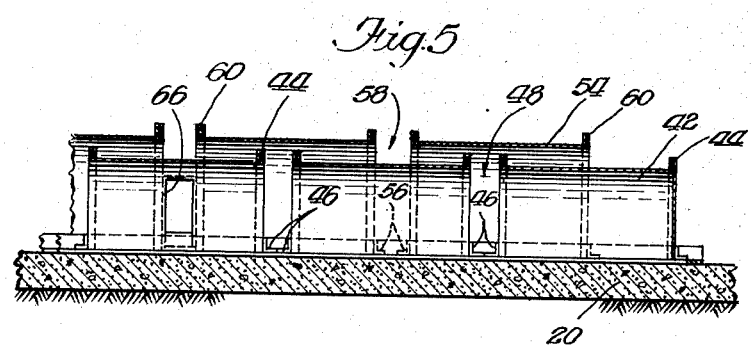
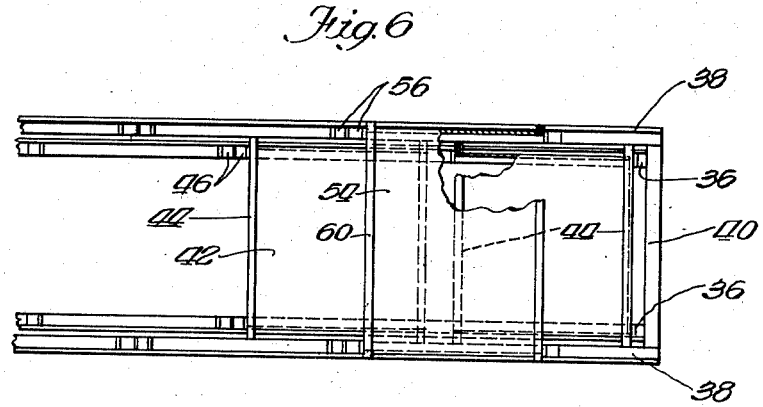
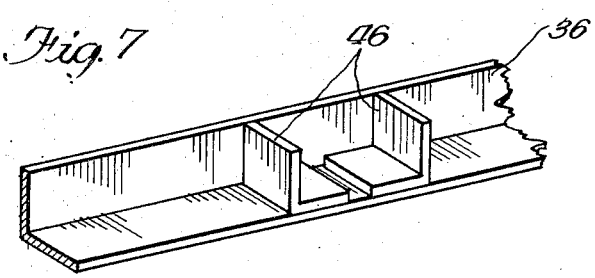
Inventor:
Max L. Rysdon
By: Bair & Freeman
Attorneys.

Patented Oct. 3, 1950

2,524,331

UNITED STATES PATENT OFFICE 2,524,331

AIR DISTRIBUTING SYSTEM FOR DRYING VARIOUS FARM BULK PRODUCE

Max L. Rysdon, Sioux Falls, S. Dak.

Application October 14, 1947, Serial No. 779,812

7 Claims. (Cl. 98—55)

This invention relates to an air distribution system or ventilation system and apparatus therefor, and is to be used primarily for drying farm produce in bulk form, such as grains and other like materials.

Various systems and constructions have heretofore been made which were adapted for use in grain bins and corn cribs and the like, for drying grain. There is a serious objection to the use of such former constructions, such as those employing perforated pipes or a raised, sheet metal floor provided with a series of small air holes for the passage of ventilating air. In such constructions, the air holes often became clogged by the grain and thus greatly reduced the efficiency of the system, and, in some cases, there resulted a substantial loss of grain which flows through such holes. Furthermore, perforations weaken the sheet metal and thus necessitating the use of heavier sheet metal to obtain proper strength, and which adds to the cost of manufacture, as well as resulting in added costs in transportation in shipment. Also, such constructions are more difficult to handle and require the use of expensive equipment in fabrication.

An object of the present invention, therefore, is to overcome the objections to previous constructions as referred to above.

Another object of the present invention is the provision of a simple and efficient air distribution system which permits free flow of air through the mass of grain or other farm produce and wherein the grain is prevented from passing into and clogging the air distribution system.

Another object is the provision of a simpified construction for air distribution which can be readily adapted to a grain bin of any conventional size or shape after the grain bin has been constructed and eliminates the necessity of constructing the grain bin specifically for the air distribution construction.

A further object is the provision of an improved air distribution and ventilation system construction which may be quickly and easily installed in place, and may be easily removed from the bin so as to permit the latter to be used for other and sundry purposes.

A further object is the provision of an improved ventilation construction made up of a number of small segments or units, whereby the construction can be adapted to any size or shape of grain bin or crib, merely by the use of a proper number of segments to conform to the shape and size of the grain bin.

A still further object of the present invention is the provision of a ventilation construction made up of separable segments which can be easily disassembled and stacked for storage or shipment.

Still another object of the present invention is the provision of a ventilation system whereby substantially even distribution of air through the grain bin or crib is accomplished.

Another object is the provision of a ventilation construction which possesses unusual strength as well as simplicity in design, the latter feature resulting in economy of manufacture.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 2 is a horizontal sectional view on an enlarged scale of the grain bin showing the apparatus of the present invention in plan view and embodying a plurality of interconnected units;

Figure 3 is a vertical sectional view, taken on line 3—3 of Figure 2;

Figure 4 is a staggered view, taken on line 4—4 of Figure 2;

Figure 5 is a sectional view, through one of the units, taken on line 5—5 of Figure 2;

Figure 6 is a partial plan view, on an enlarged scale, of one of the units of the apparatus, a portion thereof being broken away and omitted to show details of construction;

Figure 7 is a perspective view of a portion of one of the angle members of a frame element for retaining the segments of a unit in position;

Figure 1:
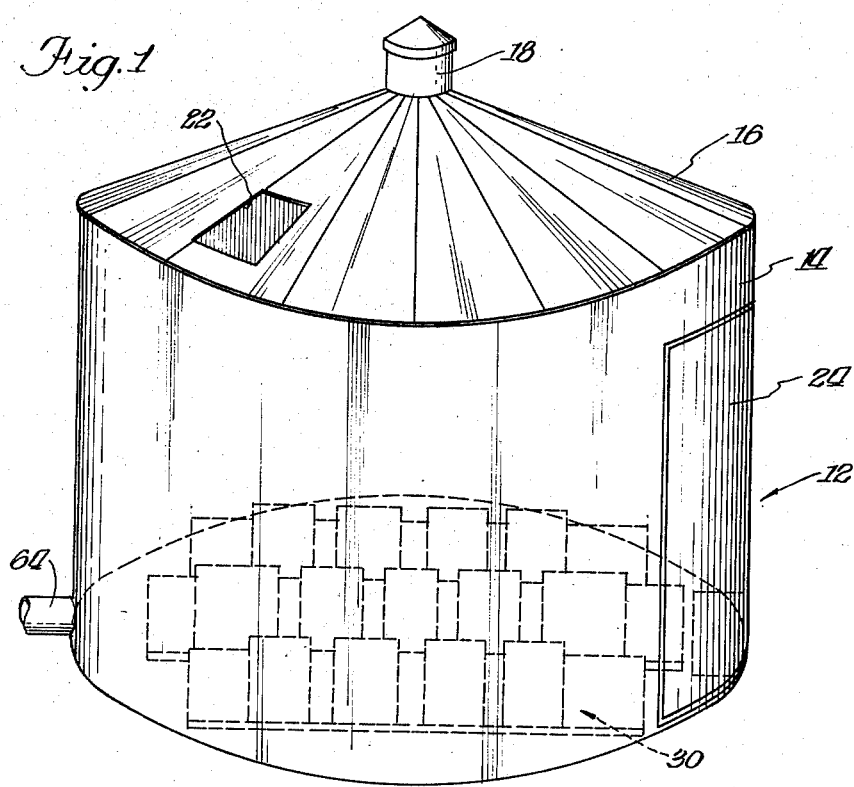
Figure 1 is a perspective view of a grain bin provided with the ventilating system embodying the present invention.

Referring now in detail to the drawings, Figure 1 illustrates a corn crib or other type of grain bin, the general construction of which may be of a well-known type. Such a bin in its essential features includes a surrounding side wall 14 and conical roof 16 which is provided with an exhaust ventilator 18 for permitting the escape of air from the bin. The construction of the bin 12 may be of any preferred type, such as corrugated sheet metal, or it may be of other suitable sheet material. The crib or bin 12 is illustrated as resting on a platform or floor 20 which forms a closure for the bottom of the bin. The floor 20 may be of concrete or other material and is preferably a plane, smooth surface to provide ease in removing the grain from the bin. The roof of the bin 12 is provided with an opening 22 for the insertion of the grain and is provided at one side with one or more doors 24 which may be opened to afford access to the bin for removal of the grain, and may be secured in closed position to retain the grain in the bin. A shield or hopper 26 is formed in the interior of the bin adjacent the doors 24, and is provided with openings in the sides thereof for grain to pass into and be removed therefrom, from the exterior through a small slide or door 28. Thus far the construction of the bin or crib 12 is conventional and in use for various types of grain.

The air distribution or ventilating apparatus of the present invention is designed for use with a grain bin as heretofore described, as well as various other forms, and is adapted to be placed on the floor thereof and be entirely covered with the grain in the bin. The apparatus is shown in its entirety by the numeral 30, and, as illustrated particularly in Figure 2, includes three portions or units which are spaced to accommodate the particular size and shape of bin 12. The apparatus includes a central unit 32 and two side units 34. The three units 32 and 34 are essentially the same with minor differences in construction which will be referred to in detail later.

Essentially, each of the three units 32 and 34 includes a frame comprising an inner pair of longitudinal angle members 36, spaced apart laterally and disposed with their horizontal legs directed toward each other. A second pair of longitudinal angle members 38 is provided adjacent the angle members 36 on the outside of the latter, and disposed in the same relationship to each other as are the angle members 36, that is, with their horizontal legs directed toward each other. The angle members 38 are thereby more widely spaced than the angle members 36 for a purpose which will appear later. The angle members 36 and 38 may be referred to as retainer members, for retaining the segments of the ventilating apparatus in position. If desired, the cross pieces 40 may be secured to the angle members 36 and 38 as by bolting so that the cross pieces may be easily applied to and detached from the angle members, the latter of which may be of varying lengths to accommodate different sizes and shapes of bins. This bolting feature also enables the angle members 36 and 38 to be knocked down for stacking preparatory to storing or shipping.

Each of the units 32 and 34 of the ventilating structure includes an inner tunnel-shaped means which is made up of a plurality of longitudinally spaced, arcuate, shell-like segments or elements 42. As illustrated in the present instance, each of the elements 42 is semi-cylindrical, having open ends and an open bottom, and of a relatively short length with respect to its diameter. The segments or elements 42 are placed in the inner angle members 36, the latter being so spaced that the elements 42 are retained therein against lateral displacement. The elements 42 may be of corrugated metal to provide strength or they may be of plain surface material if desired.

Formed on each end of each element 42 is an outwardly extending radial flange 44, extending an appreciable distance from the surface of the main portion of the element 42. Located at spaced intervals along the angle members 36 are angle brackets or stop means 46, the latter serving to retain the elements 42 in proper position longitudinally of the angle members or retainer members 36. Each pair of adjacent brackets 46 also serves to space adjacent elements 42 apart so as to leave spaces, as indicated at 48, for the free discharge of air at the ends of each of said elements.

It will be thus observed that the elements 42 are spaced in end-to-end relationship along the angle members 36 forming in effect an interrupted, elongated tunnel-shaped means, having a plurality of transverse openings spaced at intervals along the length of the tunnel.

At the outer end of the terminal elements 42 of the units 34 of the apparatus are closure plates 50, as seen in Figure 4, which close the greater part of the ends of the respective elements 42. Formed in the lower portion of each closure plate 50 is an opening 52 which permits passage of air therethrough in a certain relationship to the openings or spaces 48 between adjacent elements 42, as hereinafter referred to.

Disposed in overlapping relation to each pair of adjacent elements 42 are additional arcuate, shell-like elements 54 which may also be referred to as shields or cover means for the openings 48 between adjacent elements 42. The shields or covers 54 are substantially the same length as the elements 42, and are substantially semi-circular, similarly to the elements 42, and of a greater diameter than the latter. The shields 54 also have open ends and bottoms and are placed over the elements 42 and in the outer angle members or retainer members 38. Angle brackets or stops 56 are secured in the angle members 38, similarly to the angle brackets 46 in the angle members 36. The angle brackets 56 serve to position and retain the covers or shields 54 longitudinally along the angle members 38 so that each shield or element 54 is located in registration with and over an opening 48 between a pair of adjacent elements 42. The angle brackets 56 also space the covers or shields 54 apart leaving openings 58, between adjacent covers or shields. The shields 54 similarly to the elements 42 are provided with flanges 60 at their ends for strengthening purposes. The covers or shields 54 may also, if desired, be of corrugated metal to provide additional strength.

It will be noted that the interior dimension of the covers or shields 54 is greater than the exterior dimension of the flanges 44 on the elements 42. The flanges 44, on the inner elements 42, are for preventing grain from flowing through the spaces 48 while permitting free flow of air out of said spaces.

While the preferred shape of the elements 42 and covers 54 are semi-cylindrical, a squared shape or other shapes may be employed if desired.

The terminal element 42 of the central unit 32 adjacent the shield 26 (Figure 2) may be provided with a cover plate 50 and an opening 52 similarly as described in connection with the side units 34. The terminal element 42 at the opposite end of the central unit 32 is enclosed by a cover plate 62 through which an air duct 64 leads to the exterior of the bin 12. The air duct 64 is adapted to have connection with a blower and heated air supply means (not shown) for conveying the heated air into the adjacent element 42 and into the respective interior tunnel-shaped means in the central unit 32. Conduit means 66 provides communication between the inner tunnel-shaped means of the central unit 32, with each of the side units 34. As illustrated in Figures 2 and 4, the conduits 66 may enter through one of the outer covers or shields 54 and into communication with the interior of the elements 42 in the central unit 32, and communicates with the side units 34 through openings 58 between adjacent covers 54 opening into the exterior of the respective elements 42. It will thus be seen that air in entering through the conduit 64 will pass into the inner tunnel-shaped means of the central unit 32 and then through the conduits 66 into the inner tunnel-shaped means of the side units 34. The cover plate 62 is provided with openings 68 for the passage of air therethrough from the interior of the central portion 32 and through the grain in the bin. It is to be understood that the openings 52 in the end plates 50 of each of the units and the openings 68 at the inlet end of the unit 32 are of a size, properly correlated to the effective openings for air passage as provided by the spaces 48 and 58, between the respective elements of said units.

Instead of arranging the units 32 and 34 in side-by-side and parallel relationship, other arrangements may be employed; e. g., the units may be arranged in circular or square formation, or other formations, to accommodate various shapes of bins or cribs, or to produce different air currents depending on the type of material being dried. Also, any desired size of units may be employed to accommodate the particular size bin with which the units are to be used.

The apparatus of the present invention is easily placed in position in a bin and removed therefrom. The angle members or retainer members 36 and 38 are merely laid or set on the floor of the bin and the elements 42 and covers 54 are removably set in position in the respective angle members 36 and 38. The device is applicable to any type of bin or crib, with respect to both size and shape. The various increments or elements making up the units 32 and 34 are positioned with respect to the shape of the bin and their lengths are determined by the size of the bin. The units 32 and 34 may be set at any positions relative to one another and any number of increments or elements may be employed in making up any size air distribution system desired. It is obvious that any number of units 32 and 34 may be employed instead of only three as here illustrated.

The openings 48 between the elements 42 are shielded by the covers or shields 54 so that the grain in the bin which covers the whole apparatus will not readily flow through the openings. The flanges 44 are effective for preventing the flow of grain therethrough due to the limit of the slope which any grain will naturally assume, when moving as a mass. However, there is sufficient space between the flanges 44 and the outer covers or shields 54 to permit free flow of ventilating air therethrough and through the spaces 58 into the grain in the bin.

From the foregoing it will be apparent that the apparatus of the present invention achieves the elimination of small holes or grill work formerly provided for the passage of air therethrough. Such holes and fine grill work were easily plugged by the kernels of grain in the bin, which resulted in reduced flow of ventilating air therethrough.

It will also be apparent that the apparatus of the present invention, in addition to being easily assembled and disassembled, can be conveniently stacked for storage or shipment. The covers 54 can be stacked together and the elements 42 can likewise be stacked together with a minimum of space employed and, of course, the angular elements 36 and 38, singly or in frame formation, can be stacked in a minimum of space.

Figure 8:
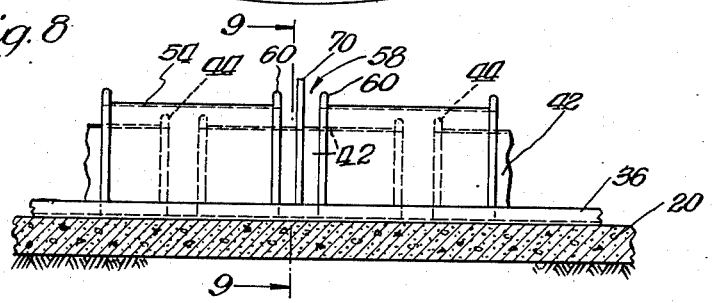
Figure 8 is a side elevational view of a portion of a unit of modified form.
Figure 9:
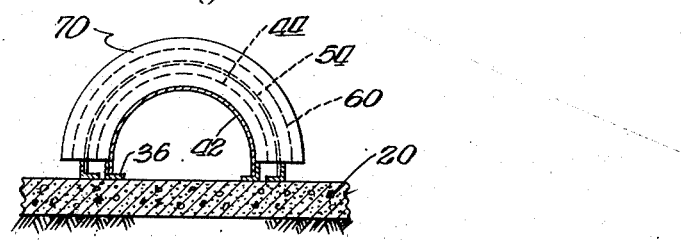
Figure 9 is a sectional view taken on line 9—9 of Figure 8.

Figures 8 and 9 illustrate a slightly modified form of construction. Each element 42 is provided with a radial flange 70 extending entirely around the periphery thereof and positioned intermediate the ends of the element. The flanges 70 are preferably at least as great in diameter as the flanges 60 on the covers or shields 54 and are for the purpose of baffling the ventilating air emerging from the respective openings 58. Preferably, as shown, the flanges 70 are located about midway between the ends of a pair of adjacent elements 54. The currents of air emerging out of the ends of adjacent covers or shields 54 tend to meet at a point substantially midway of the opening 58, and the flanges 70 are effective for baffling the respective currents outwardly through the grain.

There is no need for anchoring any portion of the device to the floor since the whole device is covered with grain in the bin and there is no force tending to shift various parts of the device about.

A still further advantage which will now be apparent is that there is no need for providing a false bottom in any bin or crib which was formerly necessary in some types of ventilating systems. Such false bottoms reduced the capacity of the bin with consequent economic loss. However, with the present construction, the full capacity of the bin is retained with the exception of the volume of the apparatus itself which, as compared with the volume of the bin, is minor.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. An air distribution apparatus adapted for placement on a floor, comprising in combination, a first group of shell-like members having open ends and bottoms, said members being adapted to be placed on the floor in end-to-end relation with spaces therebetween, said members thereby forming with the floor a segmented tunnel, the ends of said members having flanges extending laterally and vertically therefrom, and a second group of shell-like members having open ends and bottoms and of greater transverse and vertical dimensions than said flanges on the members of said first group, the members of said second group being adapted to be placed over the members of said first group in end-to-end relation with spaces therebetween, the spaces between the members of the respective groups being in staggered relation longitudinally of the construction, one of the members of said first group having inlet means for admission of air into said segmented tunnel.

2. A ventilation apparatus adapted for placement on a floor, comprising, in combination, a pair of inner longitudinal retainer members adapted to be placed on the floor, said retainer member having vertical portions a first group of arcuate members having open ends and bottoms, said arcuate members loosely and removably disposed in said retainer members in end-to-end relation with spaces between adjacent arcuate members, a pair of outer longitudinal retainer members having vertical portions, a second group of arcuate members having open ends and bottoms and of greater transverse and vertical dimensions than the arcuate members of said first group, the arcuate members of said second group being loosely and removably disposed over the arcuate members of said first group and on said outer retainer members in end-to-end relation with spaces between adjacent arcuate members, the spaces between the arcuate members of the respective groups being staggered longitudinally of the construction, said vertical portions of said retainer members being engaged by the respective arcuate members and thereby retaining the latter against lateral displacement.

3. A ventilation apparatus comprising, in combination, a plurality of separable elements adapted to form with a floor a longitudinal tunnel with transverse openings at spaced intervals therealong, said elements having flanges at their ends extending laterally and vertically therefrom, and a plurality of shields adapted to be placed over said openings and be supported by the floor, said shields being of such lateral and vertical dimensions as to provide spaces between themselves and said flanges, said shields being of substantially greater dimension longitudinally than said openings whereby said flanges are disposed a substantial distance inwardly from the ends of the shields.

4. A ventilation apparatus adapted for use on a floor and be covered with a material to be dried, comprising, in combination, a plurality of elements adapted to form with the floor a longitudinal tunnel with openings therein at spaced intervals therealong, and a plurality of shields adapted to be placed over said openings, and be supported by the floor, said shields being of such dimensions as to provide spaces between themselves and said elements, said elements having baffle means coacting with said shields to prevent the free flow of the material through said openings into said tunnel.

5. A ventilation apparatus, comprising, in combination, a pair of inner longitudinal angle members and a pair of outer longitudinal angle members, cross members secured to said angle members for retaining the latter in laterally spaced positions, a first group of arcuate members having open ends and bottoms adapted to be placed in the inner pair of angle members in end-to-end relation with spaces between adjacent arcuate members, stop means in said inner pair of angle members for longitudinally spacing said arcuate members, the ends of said arcuate members having radial flanges formed thereon, a second group of arcuate members of greater radial dimension than said flanges on the arcuate members of said first group, the arcuate members of said second group being adapted to be placed over the arcuate members of said first group and in said outer pair of angle members, the arcuate members of the second group being spaced longitudinally with the spaces therebetween being staggered longitudinally with respect to the spaces between the arcuate members of said first group, and stop means in said outer pair of angle members for spacing the arcuate members of said second group.

6. A ventilation apparatus, comprising, in combination, a first group of separable elements adapted to form with a floor a longitudinal tunnel with spaces between adjacent elements forming openings in the tunnel at spaced intervals therealong, each of said elements having a flange extending laterally and vertically at a position intermediate its ends, and a second group of separable elements adapted to be placed over said openings and be supported by the floor, the elements of said second group being of such transverse and vertical dimensions as to provide spaces between themselves and the elements of said first group and having transverse dimensions no greater than said flanges, each of the elements of said second group being positioned, when over respective ones of said openings, between two successive ones of said flanges.

7. A ventilation apparatus, comprising, in combination, a first group of separable arcuate shaped elements adapted to form with a floor a longitudinal tunnel with spaces between adjacent elements forming openings in the tunnel at spaced intervals therealong, each of said elements having a flange extending radially outwardly therefrom at a position intermediate its ends, and a second group of separable arcuate shaped elements adapted to be placed over said openings and be supported by the floor, the elements of said second group being of such diameter as to provide spaces between themselves and the elements of said first group and having radial dimensions no greater than said flanges, each of the elements of said second group being positioned, when over respective ones of said openings, between two successive ones of said flanges.

MAX L. RYSDON.

REFERENCES CITED

The following references are of record in the file of this patent:

UNITED STATES PATENTS

| Number | Name | Date |
|---|---|---|
| 1,855,519 | Hauser | Apr. 26, 1932 |
| 2,196,391 | Gronert | Apr. 9, 1940 |

FOREIGN PATENTS

| Number | Country | Date |
|---|---|---|
| 28,012 | Great Britain | May 7, 1908 |
| 488,495 | Germany | Dec. 23, 1925 |

OTHER REFERENCES

Barn Hay Drier, Agricultural Engineering Development Division, Commerce Dept., TVA; Knoxville, Tennessee. Published April 1945 (Price $1.00), page 50 relied on.